United States Patent
Hanrahan et al.

[11] Patent Number: 6,063,508
[45] Date of Patent: May 16, 2000

[54] SWAGEABLE BASE PLATE WITH GRAM LOAD OFFSET AND ADJUSTMENT FEATURE

[75] Inventors: Kevin Hanrahan; Ryan Schmidt, both of Santa Barbara, Calif.

[73] Assignee: Intri-Plex Technologies, Inc., Goleta, Calif.

[21] Appl. No.: 09/030,599

[22] Filed: Feb. 25, 1998

[51] Int. Cl.[7] .................................................... G11B 5/48
[52] U.S. Cl. ........................ 428/596; 360/104; 29/603.7
[58] Field of Search .................................. 428/596, 603, 428/599, 600; 360/104; 29/603.7

[56] References Cited

U.S. PATENT DOCUMENTS

| | | | |
|---|---|---|---|
| 4,949,194 | 8/1990 | MacPherson et al. | 360/104 |
| 5,299,081 | 3/1994 | Hatch et al. | 360/104 |
| 5,313,353 | 5/1994 | Kohso et al. | 360/104 |
| 5,452,158 | 9/1995 | Harrison et al. | 360/104 |
| 5,844,754 | 12/1998 | Stefansky et al. | 360/106 |
| 5,864,448 | 1/1999 | Berberich | 360/105 |
| 5,870,252 | 2/1999 | Hanrahan | 360/104 |
| 5,894,381 | 4/1999 | Allen et al. | 360/104 |
| 5,936,808 | 10/1999 | Huang et al. | 360/16 |
| 5,949,617 | 9/1999 | Zhu | 360/104 |

*Primary Examiner*—John J. Zimmerman
*Attorney, Agent, or Firm*—Owen L. Lamb

[57] ABSTRACT

A base plate with a hub and a flange having a clamping region in a horizontal plane and an extended flange portion. The clamping region surrounds and is contiguous with the hub. The extended flange portion has a tip region at a distal end thereof. The extended flange portion is contiguous with the clamping region and has a concentrated strain region between the clamping region and the tip region. The concentrated strain region is capable of being distorted for gram-load adjustment. The tip region may be inclined at an angle of not more than 10 degrees from the horizontal plane. For assembly in a head suspension, the tip region is welded to a load beam. The gram-load on the load beam is measured with reference to a standard and the concentrated strain region is distorted for gram-load adjustment to the standard.

18 Claims, 3 Drawing Sheets

SWAGEABLE BASE PLATE WITH GRAM LOAD OFFSET AND ADJUSTMENT FEATURE

BACKGROUND OF THE INVENTION

1. Field of the Invention

This invention relates to disk head assemblies for supporting read/write heads adjacent rotating disks in disk drives and more particularly, to a base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load. A spring section of the load beam is formed to provide the load force that counteracts the aerodynamic lift force generated by the rotating disk during operation of the disk drive.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension typically has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

A typical base plate has two primary regions, a flange region and a hub region. The flange region is a flat portion to which the load beam is welded. This area preferably remains flat and free from distortion so that it serves as a stable mounting feature for the load beam and ideally remains so throughout the swaging operation. Extended base plates are known in the art. One reason to extend a base plate flange beyond the arm clamping region is to get better clamping conditions by moving the weld points beyond the clamping area. This provides a clean mounting surface where the base plate flange meets the actuator arm mounting surface. A second advantage is that the stacking height is reduced or alternatively a thicker base plate is possible while maintaining the same stacking height.

The hub region is an extended boss whose upper end is contiguous with the flange portion and whose lower end passes through boss clearance holes in both the load beam and the actuator arm. The hub region supplies the retention torque between the base plate, which is welded to the load beam, and the actuator arm by plastically expanding and cold working during the swaging operation, creating a press fit with the actuator arm. A problem with this process is that the base plate flange becomes warped by stress from the hub during the swaging operation. Consequently, the load beam, which is welded to the base plate flange, is deformed by the warping of the base plate flange, adversely affecting the gram load on the transducer head. After assembly, the gram load is tested and if not correct the spring section of the load beam is bent appropriately to adjust the gram load to a predetermined standard. This operation may further distort the load beam and adversely affect the dynamic performance thereof.

It is, therefore, desirable to provide an actuator arm assembly for a magnetic disk unit in which a base plate provides an extended flange region to provide a strain concentrated region about which there is an axis of bending to provide gram load adjustment while also absorbing stress occurring during a swaging operation so that the base plate and a load beam welded thereto will not be excessively warped as a result of swaging. Additionally it is beneficial if such a strain concentration region were manufactured with a pre-formed bend to eliminate the need for costly bending of the resilient load beam during suspension assembly manufacturing.

SUMMARY OF THE INVENTION

This invention is concerned with a base plate comprising a hub and a flange. The flange has an outer flange region at an outer periphery of the flange and a clamping region that at least partially surrounds and is contiguous with the hub region. The flange has an extended region that is contiguous with the clamping region, the extended region having a strain concentrating configuration and a bend region. In assembly, the extended flange region is fixed to a load beam by welding.

An advantage of this invention is that it allows for a thicker base plate (by one load beam thickness) to be used thereby reducing swage gram load loss or allows for a stack height reduction for a head gimbal assembly (HGA) by one load beam thickness.

An advantage of this invention is that the extended region provides a more strain resistant region between the portion of the flange to which a load beam is welded and the hub thereby reducing flange deformation and gram load loss due to swaging.

An advantage of this invention is that the concentrated strain region serves as strain border region between the outer portion of the flange where the load beam is welded and the inner portion of the flange which is clamped fully, thereby reducing outer flange deformation and gram load loss.

An advantage of this invention is that the concentrated strain region provides a feature for adjustment of suspension pre-load and roll angle.

An advantage of this invention is that the concentrated strain region may be preformed at an angle that precludes the manufacture of such a pre-form in the suspension assembly load beam, saving processing costs.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

A hard disk drive conventionally includes at least one rotating data storage disk having its two surfaces coated with a magnetic media. A plurality of disks are mounted on a common rotating spindle which is rotated by a motor. Each data storage surface is provided with an associated head slider which "flies" in close proximity to the rotating data storage so as to write data to the surface, and to read data previously written to the surface. Each head slider is connected by a gimbal to a load beam which acts as a spring for applying a loading force, called "gram load" to the slider to push it towards a disk surface. The disk drive has several actuator arms extending from a rotary actuator structure in the form of the letter "E" called an E-block or actuator. Each load beam is connected to one of the actuator arm via a base plate. Each slider, gimbal, load beam and base plate forms an assembly known as a head-gimbal assembly (HGA).

Figure 1A:
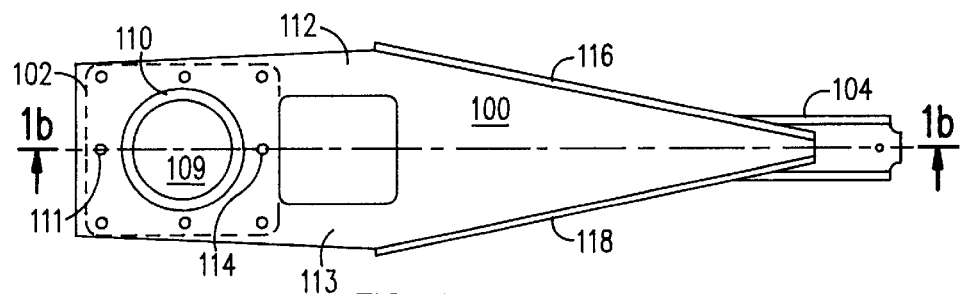
FIG. 1a is top view of a head suspension assembly of the prior art.
Figure 1B:
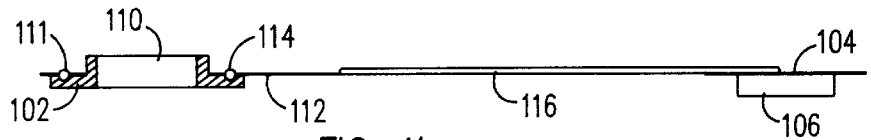
FIG. 1b is side elevation view of the head suspension assembly of FIG. 1a along the view line 1b—1b prior to bending.
Figure 1C:
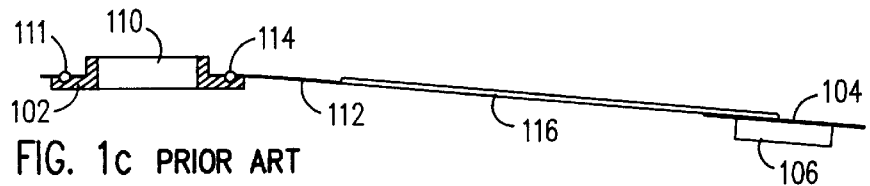
FIG. 1c is an illustration of the head suspension assembly of FIG. 1b after bending.

Refer to FIGS. 1a, 1b and 1c which illustrate a transducer suspension of the prior art. Each HGA comprises four components: a load beam 100, a base plate 102, flexure with gimbal 104, and a slider 106. The slider 106 has an air bearing surface and carries an electromagnetic transducer read/write head which is used for recording data and reading data from the disk. Wires or trace conductors used to carry the electronic data to the drive circuitry are not shown.

The base plate includes a flat flange portion 108 and a cylindrical hub portion or boss 110. The hub 110 is inserted through a load beam boss clearance hole in the load beam 100 and the flange portion 108 is welded 112, 114, etc. to the load beam. Eight welds are illustrated by the small circles in FIG. 1a.

The flexure 104 is attached to the load beam 100 and to the slider 106 by an adhesive, and is designed to be resilient with respect to the slider's pitch and roll directions to enable the slider 106 to precisely follow the topography of the disk surface. The load beam 100 is commonly formed of a thin sheet of stainless steel alloy, which forms a base for the attachment of the gimbal 104.

The base plate 102, which is a thicker plate than the load beam, is spot-welded to the load beam 100. The base plate has an annular swage hub 110 which is attached by conventional ball swaging to an associated actuator arm (not shown) of an actuator E-block. The load beam 100 includes a resilient spring section 112, 113 and a relatively rigid forward section having longitudinal stiffening ribs or rails 116, 118.

The spring section of the load beam may include two longitudinal legs 112 and 113. The spring section is resilient in the vertical direction to permit the slider 106 to follow the topography of the disk surface. The spring section also supplies a downward force that counteracts the aerodynamic lifting force developed by the slider in reaction to air pressure at the surface of the rotating data storage disk. In order to produce this counteracting force, the spring section is plastically deformed into a curved shape so that it applies a preload force to push the slider towards the disk surface. The spring preload force that counteracts the slider aerodynamic force is commonly referred to in the prior art as "gram load".

The forward section of the load beam 100 has two stiffening ribs 116, 118, bent directly from the main body of the load beam providing additional stiffness to the forward section of the load beam.

The base plate 102 which attaches the load beam to the actuator arm of the actuator is also typically formed of stainless steel alloy, having a greater thickness than the load beam so as to provide necessary stiffness for structural rigidity, dynamic stability and to facilitate swaging to the actuator arm.

The gram load is produced in the load beam by deforming an initially flat load beam against a forming die. The load beam is secured with respect to a forming contour of a die so that the end of the load beam that is welded to the base plate 102 overhangs the contour. A forming portion of the die applies a force to the load beam to force the load beam into conformance with the contour of the die. This causes the spring section 112, 113, to plastically deform to the contour of the die. As shown in FIG. 1c, this results in a permanent bend in the spring section of the load beam which provides the gram load. Once the head gimbal assembly is installed in the disk drive, the gram load of the load beam is tested and fine adjustments are made by further bending of the load beam at the spring region.

Figure 2:
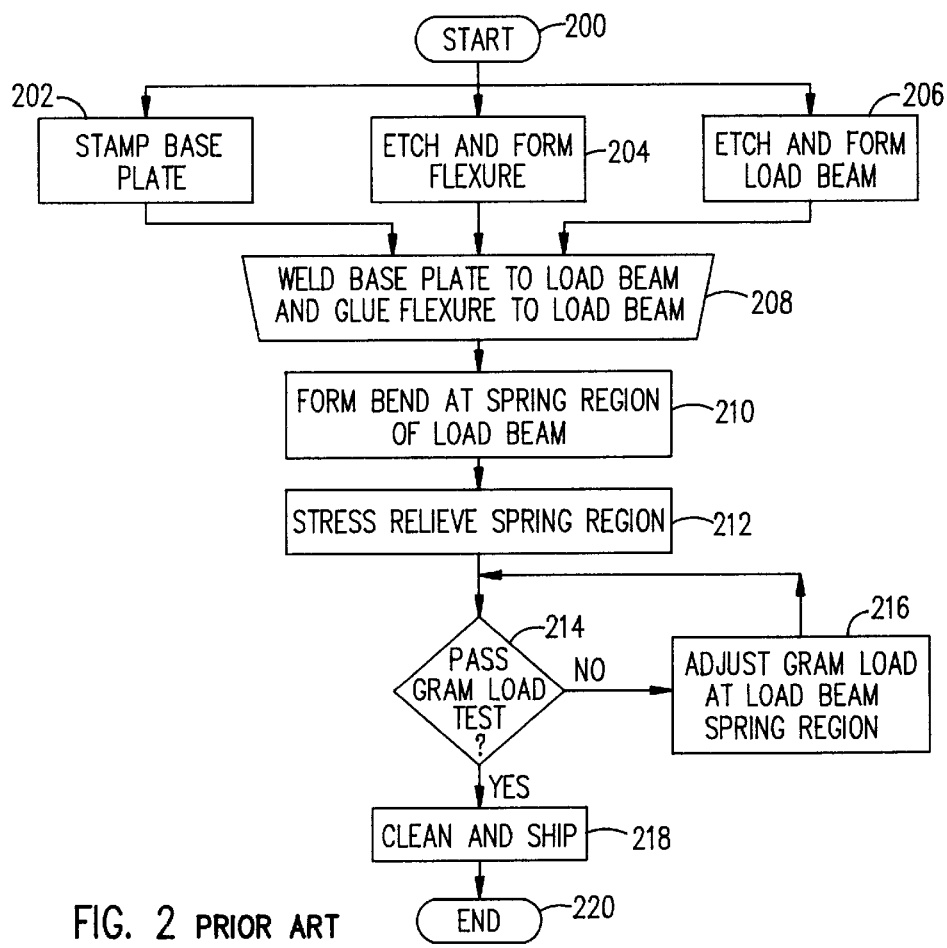
FIG. 2 is a flow diagram of manufacturing steps in the assembly of a head suspension assembly in accordance with the teachings of the prior art as shown in FIGS. 2a–2c.

FIG. 2 is a flow diagram of current typical manufacturing steps in the assembly of a head suspension assembly comprised of a load beam, flexure and base plate. The process starts 200. The base plate is stamped from a metal sheet 202. The flexure is etched and formed 204. The load beam is etched and formed 206. The load beam and flexure are glued together, the base plate hub is passed through a clearance hole in the load beam/flexure and the base plate flange is welded to the load beam 208. To provide a pre-load to the head suspension a bend is formed in the bend region of the base plate 210. Stress relieve the bend region 212. A gram-load test is made 214 and further gram load adjustments are made if necessary 216. The part is cleaned and shipped to the read-write head manufacturer for assembly with the slider and actuator arm 218 and the process ends 220.

Figure 3A:
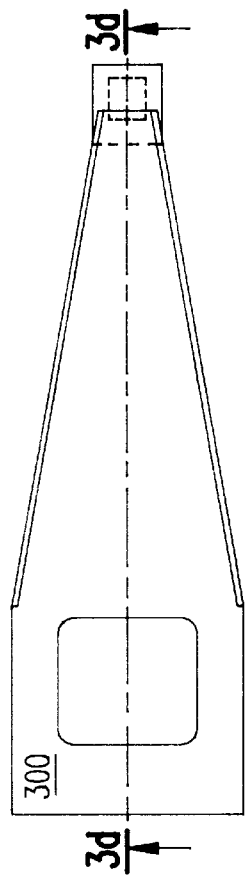
FIG. 3a is top view of a base plate illustrating an embodiment of the invention.
Figure 3B:
FIG. 3b is top view of a load beam embodying the invention.
Figure 3C:
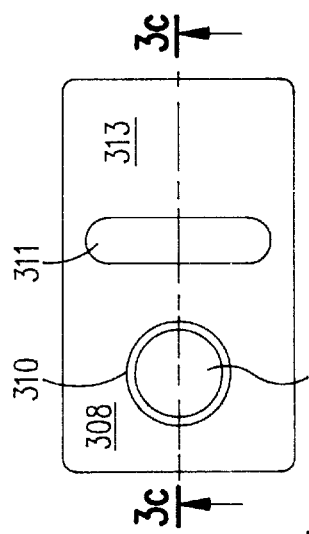
FIG. 3c is side elevation view of the base plate of FIG. 3a along the view line 3b—3b.
Figure 3D:
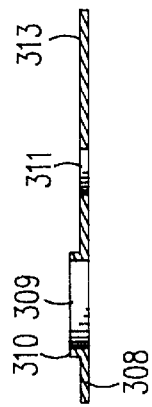
FIG. 3d is side elevation view of the load beam of FIG. 3b along the view line 3d—3d.
Figure 3E:
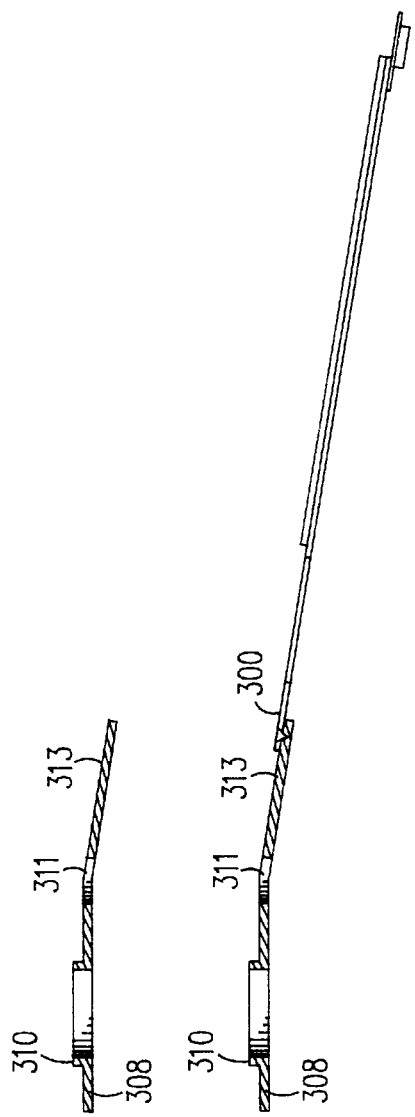
FIG. 3e is an illustration of the base plate of FIG. 3a after bending.
Figure 3F:
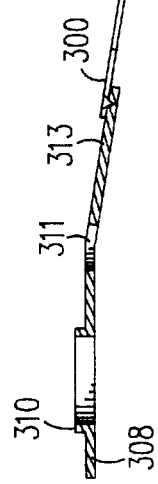
FIG. 3f is an illustration of the head suspension assembly of FIGS. 3e and 3d after assembly into a head suspension assembly; and, FIG. 4 is a flow diagram of manufacturing steps in the assembly of a head suspension assembly in accordance with the teachings of the present invention as shown in FIGS. 3a–3f.

Refer to FIGS. 3a, 3b, and 3c. The invention embodies a extended region in the flange. This configuration ensures that when a load beam with corresponding mating contour is welded on, the load beam does not contact the arm at any time during the swage operation. This way the base plate has precise clamping all the way in to the actuator arm hole inner diameter (ID). Also this invention either allows for a thicker (by one load beam thickness) base plate to be used thereby reducing swage gram loss or allows for a stack height reduction for the HGA by one load beam thickness.

Refer to FIGS. 3a–3f which illustrate an embodiment of the invention. The base plate 108 includes a flat flange portion 308 and a cylindrical hub portion or boss 310. The base plate has an inner barrel shape with a counter bore 211, a lead-in chamfer 213 and an inner diameter 215. The counter bore and inner diameter are perpendicular to the plane of the base plate flange 210. The extended flange portion 309 is welded to the load beam 300. The hub is then inserted through an actuator arm boss hole in an actuator arm (not shown). A swage ball is passed through the inner barrel 309 of the hub 310 causing pressure to be applied to cause the hub 310 to expand into the boss hole in the actuator arm, rigidly connecting the hub and attached load beam 300 to the actuator arm boss hole.

When a swage ball is forced through the inner barrel 309, the applied swage force or stress tends to strain or deform the base plate flange region 308 as the force is transmitted. The strain concentrated region 311 in the extended flange region isolates the flange tip region 313 from the hub region 310 and consequently from stress.

This invention addresses two key issues. First it allows for the adjustment of gram load at the HGA and stack level without the need for tampering with the sensitive load beam material. Second it may provide an offset angle which creates gram load without the need for forming load beams, thus saving overall processing costs.

An extended base plate with a tilted region at the tip which is adjacent to a concentrated strain region meant to be distorted during later HGA or stack level adjustment with less dynamic performance liability. The load adjustment region can embody a multitude of designs. The tip region 313 is canted slightly (not more than 10 degrees from horizontal) and can be manufactured with little trouble.

Extended base plates are known in the art. One reason to extend a base plate beyond the arm clamping region is to get better clamping conditions by moving the weld points beyond the clamping area. This provides a clean mounting surface where the base plate meets the actuator arm mounting surface. A second advantage is that the stacking height is reduced or alternatively a thicker base plate is may be used while maintaining the same stacking height.

Novelty is to provide a strain concentrated region about which there is an axis of bending. Under present manufacturing procedures, the load beam has a bend formed in it to provide a pre-load at the disk surface where the recording head meets the disk surface. With the extended base plate the base plate may have a bend formed in it prior to assembly with the load beam.

Figure 4:
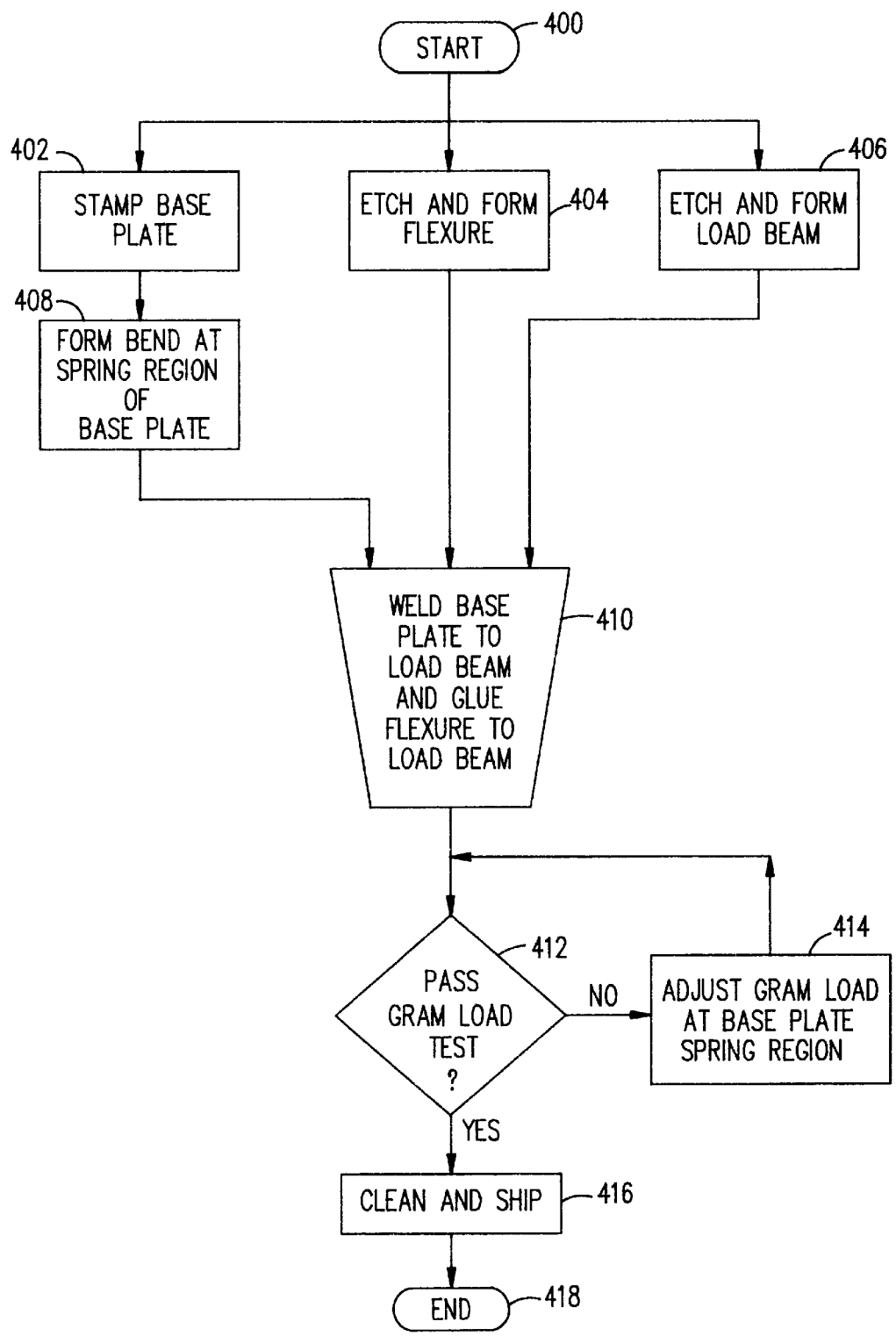

Refer to FIG. 4 which is a flow diagram of typical manufacturing steps in the assembly of a head suspension assembly in accordance with the teachings of the present invention. The process starts 400. The base plate is stamped from a metal sheet (402). The flexure is etched and formed 404. The load beam is etched and formed 406. The base plate may be bent at the spring region to provide gram load 408. The load beam and flexure are welded together, the base plate hub is passed through a clearance hole in the load beam/flexure and is welded to the load beam. An inspection and gram-load test is made 412 and further gram load adjustments are made if necessary 414. The suspension assembly is cleaned and shipped to the read-write head manufacturer for assembly with the slider and actuator arm 416 and the process ends 418.

Adjustments made by bending the load beam affect the dynamic performance of the suspension assembly, such as stiffness and frequency response. When adjustments are made in the bend region of the extended base plate, the procedure is simpler because it is not necessary to over bend as extensively as when the same adjustment is made to the relatively resilient load beam. When adjustments are made to the suspension at the load beam, it may be necessary in some cases to twist the load beam to compensate for the head not resting flat on the disk surface. When adjustments are made to the suspension at the base plate, because the base plate is a thicker member, it is not necessary to bend it as far as for adjustments made at the thinner load beam.

While the invention has been particularly shown and described with reference to preferred embodiments thereof, it will be understood by those skilled in the art that the foregoing and other changes in form and detail may be made therein without departing from the scope of the invention.

What is claimed is:

1. A base plate with a proximal end and a distal end comprising:

a hub at said proximal end; and, a flange having a clamping region in a horizontal plane and an extended flange portion;

said clamping region surrounding and being contiguous with said hub;

said extended flange portion having a tip region at said distal end;

said extended flange portion being contiguous with said clamping region and having a concentrated strain region between said clamping region and said tip region;

said tip region being inclined at an angle from said horizontal plane.

2. The base plate of claim 1 wherein said concentrated strain region is capable of being distorted in a direction of gram-load adjustment.

3. The base plate of claim 1 wherein said concentrated strain region is capable of being distorted in a direction of roll angle adjustment.

4. The base plate of claim 1 wherein said tip region is inclined at an angle of not more than 10 degrees from said horizontal plane.

5. The base plate of claim 1 wherein said tip region is fixed to a load beam.

6. The base plate of claim 2 wherein said tip region is fixed to a load beam.

7. The base plate of claim 1 wherein said tip region is inclined at an angle of not more than 10 degrees from said horizontal plane beginning at said concentrated strain region.

8. The base plate of claim 7 wherein said tip region is fixed to a load beam.

9. The base plate of claim 3 wherein said tip region is fixed to a load beam.

10. The base plate of claim 4 wherein said tip region is fixed to a load beam.

11. A method of manufacturing a head suspension comprising steps of:

A. forming a base plate with a hub and a flange having a clamping region in a horizontal plane and an extended flange portion with a tip region at a distal end of said extended flange portion;

B. forming a concentrated strain region between said clamping region and said tip region; and, C. creating an incline in said tip region at an angle from said horizontal plane.

12. The method of claim 11 wherein said angle is not more than 10 degrees from said horizontal plane.

13. The method of claim 11 comprising the further steps of:

D. fixing a load beam to said tip region;

E. measuring gram-load on said load beam with reference to a standard; and,

F. distorting said concentrated strain region for gram-load adjustment to said standard.

14. The method of claim 13 wherein said an angle is not more than 10 degrees from said horizontal plane.

15. The method of claim 11 wherein step C said tip region is inclined at an angle from said horizontal plane beginning at said concentrated strain region.

16. The method of claim 12 wherein step C said tip region is inclined at an angle from said horizontal plane beginning at said concentrated strain region.

17. The method of claim 13 wherein step C said tip region is inclined at an angle from said horizontal plane beginning at said concentrated strain region.

18. The method of claim 14 wherein step C said tip region is inclined at an angle from said horizontal plane beginning at said concentrated strain region.

* * * * *